United States Patent [19]

Cross et al.

[11] 4,331,337

[45] May 25, 1982

[54] AIR FILM-EXPANDED GAS SEALS

[76] Inventors: Michael E. Cross, 52 Bloomfield Ave., Bath, Avon; Rodney A. Cross, Raby Villa, Sidney Wharf, Bath, Avon, both of England

[21] Appl. No.: 209,828

[22] Filed: Nov. 24, 1980

[30] Foreign Application Priority Data

Nov. 23, 1979 [GB] United Kingdom ............... 7940578

[51] Int. Cl.$^3$ ..................... F16J 15/42; F16J 15/48
[52] U.S. Cl. ......................................... 277/1; 277/25; 277/27; 277/135; 277/137; 277/173; 277/216; 277/220; 277/3
[58] Field of Search .................. 277/1, 3, 13, 14 R, 277/14 V, 25, 27, 135, 136, 173, 137, 216, 217, 220, 221, 222, DIG. 5

[56] References Cited

U.S. PATENT DOCUMENTS

| 1,280,739 | 10/1918 | Hughes | 277/222 |
| 2,222,922 | 11/1940 | Wallace | 277/217 |
| 3,836,216 | 9/1974 | Junker | 277/27 X |

FOREIGN PATENT DOCUMENTS

| 1037786 | 8/1958 | Fed. Rep. of Germany | 277/135 |
| 723772 | 1/1932 | France | 277/216 |
| 23202 | 12/1930 | Netherlands | 277/136 |

Primary Examiner—Robert S. Ward, Jr.
Attorney, Agent, or Firm—McGlew and Tuttle

[57] ABSTRACT

A ring-shaped sealing member is configured to effect a seal between a shaft arranged to rotate in one sense within a housing at a relatively high rate—typically in excess of 10,000 r.p.m. The sealing member fits closely around the shaft but is split to allow circumferential expansion thereof. At least one ramp surface facing the shaft is defined by the sealing member, the clearance between the shaft and ramp surface decreasing in the direction of normal rotation of the shaft.

On rotation of the shaft at a high speed, air is carried round by the shaft within the gap of decreasing clearance between the shaft and ramp surface of the sealing member. The sealing member is expanded circumferentially thereby, and when the shaft rotates sufficiently quickly the air film carried round by the shaft lifts the sealing member completely clear of the shaft, the air film maintaining the seal between the shaft and the sealing member.

13 Claims, 5 Drawing Figures

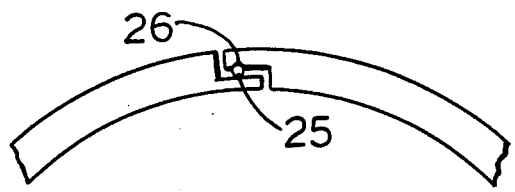
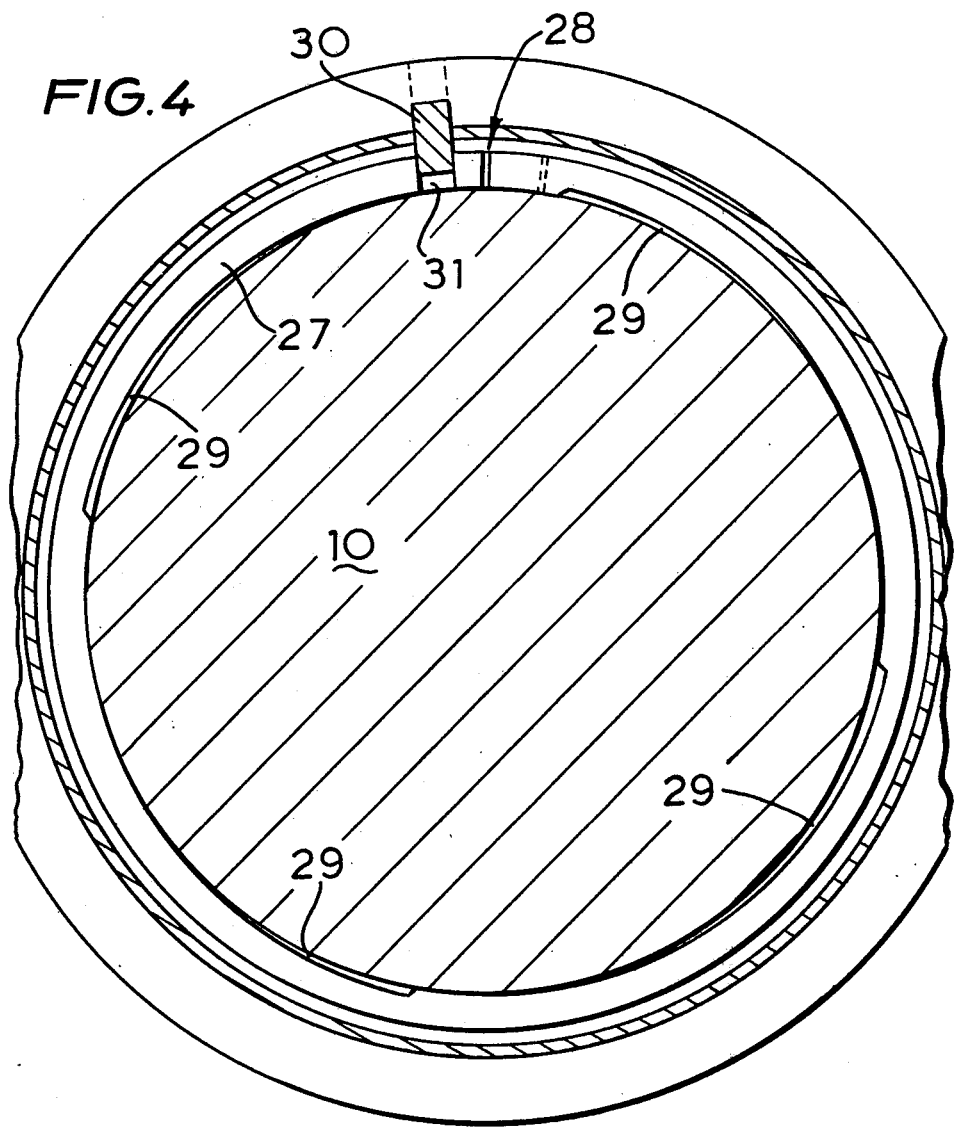

AIR FILM-EXPANDED GAS SEALS

BACKGROUND OF THE INVENTION (a) Field of the Invention

This invention concerns gas seals and in particular relates to a sealing member for and a method of effecting a gas seal between a shaft and a housing which surrounds with clearance the shaft, as well as to a complete seal assembly comprising a rotatable shaft, a housing surrounding the shaft and a sealing member fitted therebetween.

(b) Description of the Prior Art

There have been designed various forms of seal capable of effecting a seal between a rotatable shaft and a housing which surrounds the shaft, for instance to prevent foreign matter which may be present outside the housing on one side of the seal entering the housing. The provision of an effective seal is particularly important for the case where a bearing for the shaft is provided within the housing, to prevent damage to the bearing, and in such a case, the seal may serve the further purpose of preventing lubricant or other liquids from leaving the housing.

A known form of seal suitable for the above purposes comprises a member which is adapted to be mounted in the housing and fits around the shaft, the member for instance being made of a resilient material such as a natural or synthetic elastomer. Such a seal member is quite satisfactory for effecting a seal to a shaft intended to rotate at low speeds, but as the speed of rotation rises, so does the rate of wear of both the seal member and shaft itself. Consequently, with shafts intended to rotate at very high speeds (for instance, 10,000 r.p.m. or more), it is advantageous to provide a seal member which is retained within the housing in such a way that the member does not contact the shaft but fits very closely therearound with a minimal clearance. For example, the seal member may be elongate axially and provided with a plurality of circular ribs on its inner surface, which ribs fit within but do not touch correspondingly shaped grooves formed in the shaft; such a seal is known as a labyrinth seal. The sealing effect of a labyrinth seal may be enhanced by providing air or a gas under pressure at an appropriate point to the seal member, so that the air or gas bleeds outwardly through the labyrinth path defined by the shaft and the seal member, thereby reducing the probability of foreign matter entering the labyrinth path.

The above-described form of labyrinth seal suffers from several disadvantages. The seal member must be made in at least two parts in order to be capable of being fitted around the shaft, and this causes problems in manufacture and assembly. Machining of the seal member is critical and must be formed to tight tolerances; machining of the grooves in the shaft may also cause problems. The seal member must be mounted rigidly within the housing to ensure that the member does not contact the shaft at any point, and moreover if clearances are to be maintained at the smallest values possible, then the shaft must run with a very high degree of truth; little if any run-out is permissible. Also the supply of compressed air or gas to the seal leads to further complications and an increase in the amount of equipment necessary.

OBJECTS OF THE INVENTION

It is a principal object of this invention to provide a seal member which is capable of effecting a gas seal between a shaft adapted to rotate at relatively high rates and a housing for the shaft.

More specifically, it is an object of this invention to provide a ring-like sealing member which is adapted to fit closely around a rotatable shaft and which may be received in a recess in a housing which also surrounds the shaft, the ring being appropriately configured to allow the function of a gas seal with respect to the shaft, without the need to inject gas under pressure to the seal region.

Another object of this invention is to provide a seal assembly constituted by a shaft arranged to rotate at a relatively high rate (for instance in excess of 10,000 r.p.m.), a housing therefor, and a gas seal member held against rotation in the housing and for effecting a gas seal with respect to the shaft, without the need to inject gas to the seal region.

Yet another object of this invention is the provision of a seal assembly which may be used with a shaft having at least a small degree of run-out, and which is easy to install, the shaft not needing any special machining operations other than for its ordinary outer diameter.

A further object of this invention is to provide a seal arrangement as well as a method of sealing a housing to a shaft, which arrangement and method are suitable for use with gas turbine rotors or other shafts intended to have relatively high uni-directional rotational rates, when in use.

SUMMARY OF THE INVENTION

According to one aspect of this invention, there is provided a sealing member for effecting a seal between a housing and a shaft mounted for rotation normally in one sense only, said housing surrounding with clearance the shaft and said sealing member being in the form of a ring adapted loosely to be fitted within said housing so as closely to surround said shaft, said ring having a split which allows circumferential expansion thereof and having a radially inner face which is so formed as to define at least one ramp surface with respect to the shaft around which the ring is fitted, whereby the clearance between said inner face of the ring and said shaft decreases from a maximum value at a first point on the ring to a second point spaced angularly from said first point in the direction of normal rotation of the shaft, the ring touching the shaft at said second point so that on rotation of the shaft at a sufficiently high speed, gas is carried round by the shaft within said clearance so as circumferentially to expand said ring and lift said second point of said ring clear of the shaft.

It will be appreciated that when the sealing member of this invention is fitted in a housing to surround a shaft adapted for rotation in one direction at a relatively high speed (typically in excess of 10,000 r.p.m.), a gas seal utilising the surrounding gas (and usually air) is formed and there is no direct contact between the sealing member (ring) and the shaft; instead, a film of gas exists between the shaft and the sealing member, which film is maintained by the shaft rotation and keeps the sealing member lifted off the shaft. There is however no need to provide means to supply gas under pressure to the sealing member, for the gas film is created by the rotation of the shaft itself. Though usually the gas in the region of the seal will be air, it could of course be any other gas or mixture of gases; reference will however hereinafter be made expressly to air, though the term should be interpreted broadly to include all types of gases.

According to another aspect of this invention, there is provided a sealing assembly of a shaft, a housing in which is mounted said shaft for normal rotation in one sense only, and a sealing member in the form of a ring received in a recess in said housing so as closely to surround said shaft, said ring having a split which allows circumferential expansion thereof and having a radially inner face which is so formed as to define at least one ramp surface with respect to the shaft around which the ring is fitted, whereby the clearance between said inner face of the ring and said shaft decreases from a maximum value at a first point on the ring to a second point spaced angularly from said first point in the direction of normal rotation of the shaft, the ring touching the shaft at said second point so that on rotation of the shaft at a sufficiently high speed, gas is carried round by the shaft within said clearance so as circumferentially to expand said ring and lift said second point of said ring clear of the shaft, said recess in the housing in which the sealing member is located being shaped to allow the sealing member to move in a radial plane of the shaft.

According to yet a further aspect of this invention, there is provided a method of effecting a seal between a shaft and a housing within which said shaft is mounted for rotation in one sense, in which method a sealing member in the form of a ring is loosely fitted in a recess in the housing so that the ring fits closely around the shaft, said ring having a split which allows circumferential expansion thereof and having a radially inner face which is so formed as to define at least one ramp surface with respect to the shaft, whereby the clearance between said inner face of the ring and said shaft decreases from a maximum value at a first point on the ring to a second point spaced angularly from said first point and at which the ring touches the shaft, and rotating the shaft rapidly so that a gas film is generated between the sealing member and the shaft by gas being carried round with said shaft on rotation thereof in the direction of decreasing clearance between said ramp surface of the ring and the shaft, which film expands said ring circumferentially to lift the ring clear of the shaft.

It will be appreciated that the sealing method of this invention does not require the provision of any auxiliary equipment such as a source of compressed air and, provided that the sealing member is properly configured and the shaft rotates with at least a minimum speed in the direction of decreasing clearance between the ramp surface of the sealing member and the shaft, the seal is essentially frictionless whilst being self-sustaining. Moreover, the minimum clearance between the sealing member and the shaft, even when the ring is clear of the shaft, is only a very small amount and typically a few microns—and consequently the probability of foreign matter passing through the seal is very small.

BRIEF DESCRIPTION OF THE DRAWINGS

These and other objects and advantages of this invention will become more apparent from the following description of preferred arrangements and specific embodiments of this invention, reference being made to the drawings, as appropriate. In the drawings:

FIG. 3 is a detail view of a modification of the sealing member shown in FIG. 2;

FIG. 4 is an end view of a second embodiment of sealing member of this invention.

DESCRIPTION OF THE PREFERRED EMBODIMENTS

Figure 2:
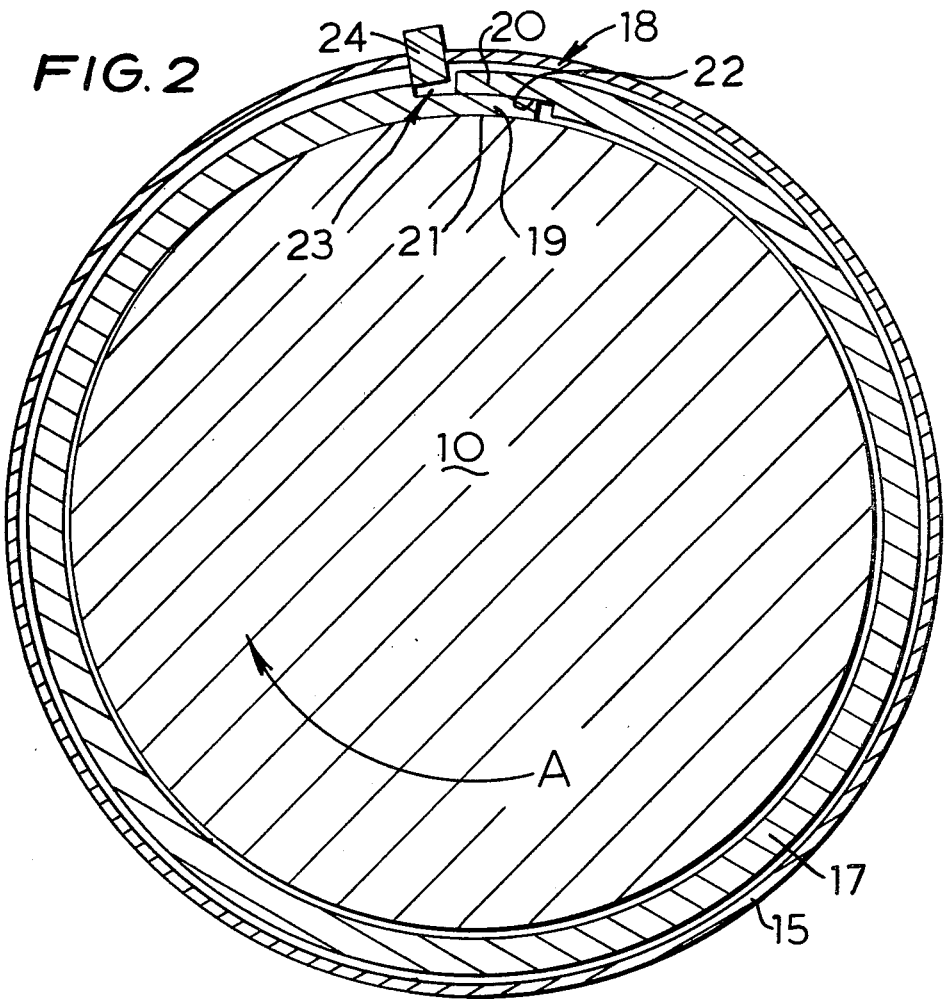
FIG. 2 is an end view on an enlarged scale of the assembly in FIG. 1.

When using a sealing member of this invention, it is essential that the ramp surface is properly formed to allow the gas seal fully to be developed on rotation of the shaft at an appropriate rate. A typical maximum value for the clearance is of the order of 0.005 inches (about 0.125 mm) though advantageous results have been obtained with maximum values in the range of 0.002 to 0.003 inches (from about 0.05 to about 0.075 mm). It will of course be appreciated that the maximum value as well as the angular extent of the ramp surface—and hence the "angle" of taper of the clearance—depends upon a variety of factors including the diameter of the shaft, the axial extent of the sealing member, the surface finish of the shaft and sealing member, the temperature of the air at the installation location and so on. In the case in which only one ramp surface is provided, it is preferred for that ramp surface to have an angular extent of slightly less than $2\pi$ radians, though typically three or four such ramp surfaces may be provided—in which cases, each ramp surface should have a length of slightly less than $2\pi/3$ or $\pi/2$ radians, respectively. Whatever the number of ramp surfaces chosen, the split in the ring should be disposed at an angular position on the sealing member other than in a region where there is a reducing clearance—i.e. not to cut through a ramp surface.

The inner surface of the sealing member may be formed to define the ramp surface in various ways. For example, the inner surface of the member may be machined to provide the ramp surface. Another possibility for the case of a metal sealing member is to arrange for the member to be rolled from a metal strip, and to adjust the rolls suitably to provide the or each ramp surface during the rolling step. Yet another possibility, in the case where there is but one ramp surface, is for the two adjacent end portions of the sealing member at the split therein to be stepped but in the opposite sense so that one end portion may overlie the other end portion. By appropriate adjustment of the radial thicknesses of the stepped end portions, the ramp surface may be created; the thicknesses should be adjusted so the inner surface of the sealing member is discontinuous at the split therein, the inner surface at the radially outer end portion which overlies the radially inner end portion being spaced outwardly with respect to the inner surface at the radially inner end portion by an amount equal to the required maximum value of the clearance.

For an arrangement with stepped end portions, in order to accommodate the circumferential expansion of the sealing member, the two end portions must be capable of sliding one with respect to the other. In order to allow free sliding movement, a roller may be accommodated between the two end portions, whereby one end portion may roll over the other. The roller may be free or may be fitted with a cage to maintain the roller in the required position. Another possibility is for the roller to be accommodated within a V-shaped groove in one of the end portions, which groove extends parallel to the axis of the sealing member. Whatever the arrangement employed, the thicknesses of the end portions must be adjusted appropriately, to ensure the required clearance is maintained.

Apart from the possibility of using stepped end portions (as discussed above), the sealing member may have the split formed as a simple radial cut, the two ends of the member abutting but separating as the member expands circumferentially. The split may instead be formed by a cut extending at some angle to a radial plane, the ends again abutting. These configurations, including that with stepped end portions, may be used with sealing members other than those having the ramp surface formed by adjustment of the thicknesses of overlapping end portions.

It will be appreciated that the sealing member of this invention should be accommodated loosely within the housing in order that the sealing member may fit closely around the shaft. Not only does this obviate the need to machine with great accuracy that part of the housing which receives the sealing member, but also allows for a certain amount of run-out on the shaft. Because then the sealing member is not held tightly in the housing, it is preferred for there to be means provided to prevent rotation of the sealing member, when installed in the housing. For example, a peg may be provided for mounting in the housing so as to project therefrom into a suitably-formed recess in the sealing member, so as to prevent rotation thereof despite rotation of the shaft. However, it would be possible for some applications for the sealing member not to be restrained against rotation. Then, the sealing member may rotate with the shaft when the latter rotates slowly, but as the shaft speed increases, an increasing differential between the shaft speed and the sealing member speed will occur until an air film is formed, to lift the sealing member completely clear of the shaft. At this point, the friction between the ring and shaft will be much lower than that between the ring and housing, so that the ring will tend to stop rotating altogether, ensuring the air film is maintained.

The recess in the housing and in which the sealing member fits should be of very slightly greater axial dimensions than the sealing member itself, whereby the sealing member is effectively constrained against axial movement but nevertheless may slide freely in a radial plane. In order to accommodate a shaft which has a relatively large run-out, as well as a possible lack of concentricity between the recess in the housing and the shaft, it is preferred for the sealing member to be capable of moving in a radial direction by at least 0.0625 inches (approximately 1.5875 mm) from a mean position.

Preferably, means are provided within the housing to prevent rotation of the sealing member, such as a peg engageable with a recess in the sealing member.

Figure 1:
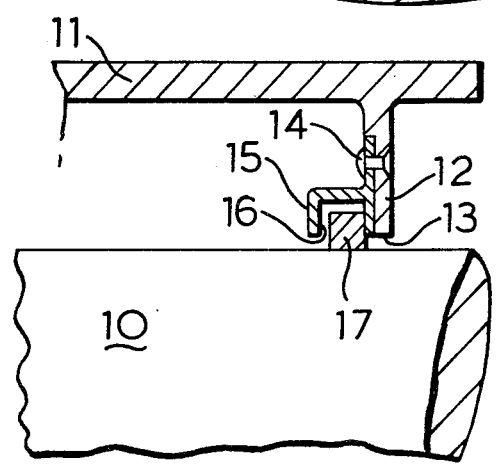
FIG. 1 is a diagrammatic view of a shaft, housing therefor and sealing member assembled together in accordance with this invention.

Specific embodiments incorporating various of the preferred features referred to above will now be described in detail. The first embodiment is shown in FIGS. 1 and 2, and there is shown a shaft 10 which is mounted for rotation in bearings (not shown) in the direction of arrow A. The shaft is disposed partially within a housing 11 which housing has an inwardly-directed flange 12 defining a circular orifice 13 which surrounds with clearance the shaft 10. Clamped to the flange 12, for instance by means of rivets 14, is a support member 15 which defines a generally rectangular recess 16 facing and extending circumferentially around the shaft 10. A sealing member 17 is mounted in the recess 16, which member 17 effects an air seal between the housing 11 and the shaft 10, when the shaft rotates at least at a predetermined minimum speed in the direction of arrow A.

The sealing member 17 is shown in greater detail on an enlarged scale on FIG. 2. The member is in the form of a ring for instance of a resilient metal such as a bronze, the ring being split at 18 and the two end portions 19 and 20 being stepped oppositely so as to be capable of overlapping one another, as shown. In this way, the member 17 may expand circumferentially, by relative sliding movement of the two end portions 19 and 20. The radial thickness of the radially inner end portion 19 and the radial thickness of the radially outer end portion 20 should be selected so that the radius of the inner surface 21 of the end portion 19 is less than the radius of the inner surface 22 of the end portion 20 by a fixed predetermined amount, of typically 0.0025 to 0.0030 inches (0.0635 mm to 0.076 mm).

When the sealing member is assembled in the housing as described with reference to FIG. 1, the inner surface 21 of the end portion 19 will bear on the shaft 10, whereas the inner surface 22 of the end portion 20 will be clear of the shaft by a fixed amount which is predetermined by appropriate selection of the radial thicknesses of the end portions 19 and 20 in the overlapping region. Because the sealing member 17 is essentially circular and the end portion 20 is spaced from the shaft 10 whereas the end portion 19 touches the shaft, the inner surface of the member, from surface 22 to surface 21, will form a ramp with respect to the shaft, the clearance between the inner surface of the member 17 and the shaft decreasing from the maximum value down to zero in the direction A of normal rotation of the shaft.

As shown in FIG. 2, the circumferential length of the radially outer stepped end portion 20 is less than the circumferential length of the radially inner stepped end portion 19, so that a recess 23 is formed between the free end of the outer end portion 20 and the remainder of the sealing member 17. A peg 24 is mounted in the housing 11 and projects into the recess 23, so as to prevent rotation of the sealing member 17.

In use and on rotation of the shaft 10 in the direction of arrow A with at least a minimum speed, air in the vicinity of the seal will be carried round by the shaft and owing to the reducing clearance between the ring inner surface of the sealing member 17 and the shaft 10, a film of air will be formed between the member and the shaft, thereby lifting the member completely clear of the shaft. Typically, this film will be of the order of 2.5 microns thick, and though the circumferential expansion required for such a clearance is minimal, nevertheless such expansion may occur by relative sliding movement between the two stepped end portions 19 and 20. Moreover, any run-out present when the shaft rotates can be accommodated by movement of the member 17 in the radial plane, by the member sliding in that plane within the support member 15.

Particularly in the case of a seal to be effected between a stationary housing and a shaft which rotates at very high speeds—and typically not less than 10,000 r.p.m.—it is advantageous to make the sealing member from a material other than a metal, such as a ceramic which may, within relatively narrow limits, deform resiliently in the required manner. Another possibility is to coat a metallic ring with a wear-resistant coating, such as a chromium plating, in order to minimise wear during the period when the shaft is running up to speed and before the air seal is established—for wear rapidly could diminish the formation of the air film between the ring and the shaft.

FIG. 3 shows a detailed view of a modified form of sealing member for use in a seal configured generally as shown in FIG. 2. In this modified form, there is provided a roller 25 between the two stepped end portions 19 and 20 of the sealing member 17, which roller 25 is located in a groove 26 extending parallel to the axis of the ring in the inwardly-directed face of the stepped radially-outer end portion 20. The provision of such a roller 25 allows friction between the two end portions 19 and 20 to be reduced to a minimal value, thereby assisting free relative sliding movement between the two end portions as the ring expands circumferentially on formation of the air film, lifting the ring clear of the shaft.

FIG. 4 shows an alternative form of sealing member for use in the arrangement depicted in FIG. 1. In this arrangement, the sealing member 27 is split at 28 in a radial plane, the two radial end faces of the member 20 simply abutting when the member is relaxed. Once fitted closely to surround around a shaft 10, the two end faces may move apart as required, leaving a gap therebetween. By a machining operation, the inner surface of the ring is provided with four spaced but similar ramp surfaces 29, each of approximately $\pi/2$ radians extent. Each ramp portion defines in conjunction with the shaft a clearance which decreases from a maximum value of typically 0.0025 inches (0.0635 mm) down to zero. Thus, with the member 27 shown in the relaxed position in FIG. 4, the ring touches the shaft at both ends thereof, to either side of the split 28, as well as at three intermediate points; but on rotation of the shaft in the direction of arrow A, the member is lifted clear of the shaft 10 by virtue of the generation of an air film by means of the four ramp surfaces 29, air being carried round by rotation of the shaft within the clearances defined by the ramp surfaces.

In a similar manner to that described above, with reference to FIG. 2, the member 27 is prevented from rotating by virtue of a peg 30 fixed within the housing and located in a recess 31 provided in the member 27.

Figure 5:
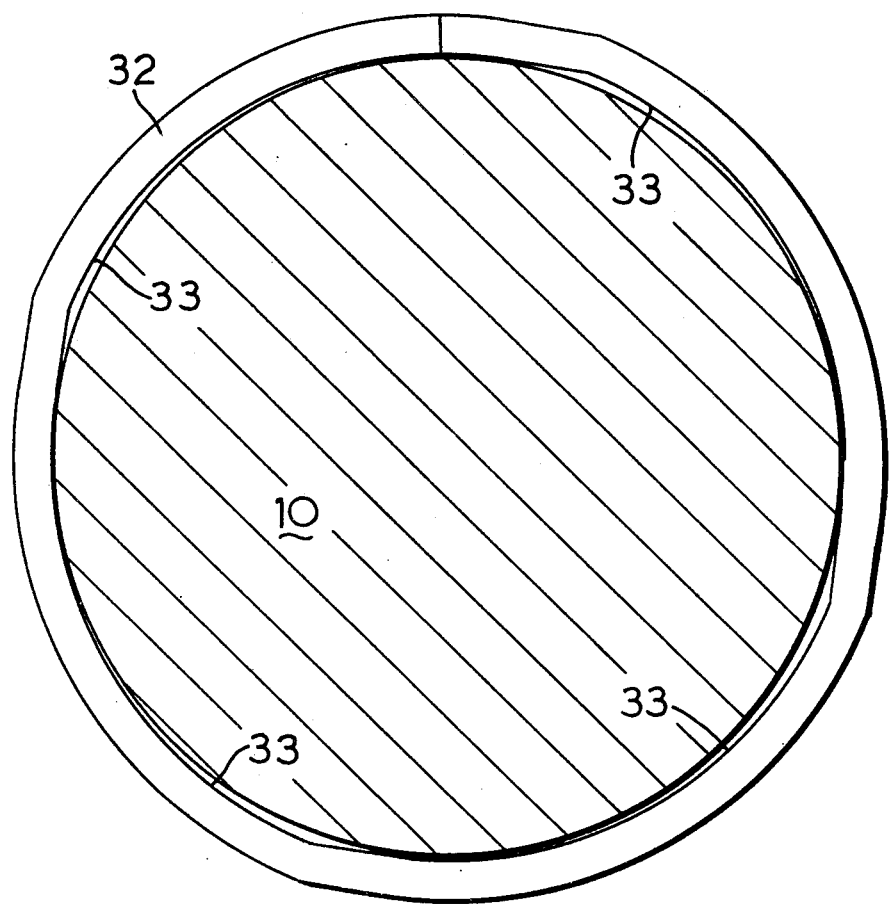
FIG. 5 is an end view of a third embodiment of sealing member of this invention.

FIG. 5 shows a further possible configuration of sealing member of this invention, which member 32 is generally similar to that shown in FIG. 4, but has four ramp surfaces 33 formed in a different way. In the embodiment of FIG. 4, the ramp surfaces are formed by machining, whereas in the embodiment of FIG. 5, the ramp surfaces are formed by a rolling operation, during the manufacture by rolling of the member from a strip of metal. This is achieved by appropriate adjustment of the spacing of the rolls forming the strip into the ring-shaped sealing member 32. The free ends of the member 32 abut in a radial plane, as in the embodiment of FIG. 4, and the sealing member forms an air seal in the same manner as has been described above, with air being carried round on rotation of the shaft 10 in the direction of arrow A, to form an air film between the shaft and the sealing member 32.

What is claimed is:

1. A sealing member for effecting a seal between a housing and a shaft mounted for rotation normally in one sense only, said housing surrounding with clearance the shaft and said sealing member being in the form of a ring adapted loosely to be fitted within said housing so as closely to surround said shaft, said ring having a split which allows circumferential expansion thereof and having a radially inner face which is so formed as to define at least one ramp surface with respect to the shaft around which the ring is fitted, whereby the clearance between said inner face of the ring and said shaft decreases from a maximum value at a first point on the ring to a second point spaced angularly from said first point in the direction of normal rotation of the shaft, the ring touching the shaft at said second point so that on rotation of the shaft at a sufficiently high speed, gas is carried round by the shaft within said clearance so as circumferentially to expand said ring and lift said second point of said ring clear of the shaft.

2. A sealing member as claimed in claim 1, in which said ring is pre-formed so that said maximum value of said clearance at said first point is no greater than substantially 0.005 inches.

3. A sealing member as claimed in claim 2, in which said ring is pre-formed so that said maximum value of said clearance at said first point is in the range of from 0.002 to 0.003 inches.

4. A sealing member as claimed in claim 1 or claim 2, in which said split allowing circumferential expansion of said ring is provided at a circumferential position on the ring outside the angular spacing between said first and second points.

5. A sealing member as claimed in claim 1, in which said ring defines solely one ramp surface and at said split in the ring the two adjacent end portions of the ring are stepped respectively in opposite senses and relatively disposed with one end portion overlying the other end portion.

6. A sealing member as claimed in claim 5, in which the radial thicknesses of said stepped end portions are controlled to predetermined values so as to create said ramp surface, said inner surface of the ring being discontinuous at the split.

7. A sealing member as claimed in claim 6, in which a roller is accommodated between said overlying two end portions, thereby to reduce friction therebetween on circumferential expansion of the ring.

8. A sealing member as claimed in claim 1, in which said ring defines four ramp surfaces, said surfaces being equi-spaced around the internal periphery of the ring.

9. A sealing assembly of a shaft, a housing in which is mounted said shaft for normal rotation in one sense only, and a sealing member in the form of a ring received in a recess in said housing so as closely to surround said shaft, said ring having a split which allows circumferential expansion thereof and having a radially inner face which is so formed as to define at least one ramp surface with respect to the shaft around which the ring is fitted, whereby the clearance between said inner face of the ring and said shaft decreases from a maximum value at a first point on the ring to a second point spaced anguarly from said first point in the direction of normal rotation of the shaft, the ring touching the shaft at said second point so that on rotation of the shaft at a sufficiently high speed, gas is carried round by the shaft within said clearance so as circumferentially to expand said ring and lift said second point of said ring clear of the shaft, said recess in the housing in which the sealing member is located being shaped to allow the sealing member to move in a radial plane of the shaft.

10. A sealing assembly as claimed in claim 9, in which said recess in which said ring fits is shaped to allow the ring slidably to move in the radial direction, but to constrain the ring against any substantial axial movement.

11. A sealing assembly as claimed in claim 9 or claim 10, in which means are provided within said housing to prevent rotation of said ring.

12. A sealing assembly of a shaft, a housing in which is mounted said shaft for normal rotation in one sense only, and a sealing member in the form of a ring received in a recess in said housing so as closely to surround said shaft, said ring being discontinuous and the two adjacent end portions of said ring at the discontinuity being stepped respectively in opposite senses and relatively disposed with one end portion overlying the other end portion, whereby said ring may expand circumferentially, said ring also having a radially inner face which is so formed as to define at least one ramp surface with respect to the shaft around which the ring is fitted, whereby the clearance between said inner face of the ring and said shaft decreases from a maximum value of not more than 0.005 inches at a first point on the ring to a second point spaced angularly from said first point in the direction of normal rotation of the shaft, the ring touching the shaft at said second point so that on rotation of the shaft at a sufficiently high speed, gas is carried round by the shaft within said clearance so as circumferentially to expand said ring clear of the shaft, said recess in the housing in which the sealing member is located being shaped to allow the sealing member to move in a radial plane of the shaft.

13. A method of effecting a seal between a shaft and a housing within which said shaft is mounted for rotation in one sense, in which method a sealing member in the form of a ring is loosely fitted in a recess in the housing so that the ring fits closely around the shaft, said ring having a split which allows circumferential expansion thereof and having a radially inner face which is so formed as to define at least one ramp surface with respect to the shaft, whereby the clearance between said inner face of the ring and said shaft decreases from a maximum value at a first point on the ring to a second point spaced angularly from said first point and at which the ring touches the shaft, and rotating the shaft rapidly so that a gas film is generated between the sealing member and the shaft by gas being carried round with said shaft on rotation thereof in the direction of decreasing clearance between said ramp surface of the ring and the shaft, which film expands said ring circumferentially to lift the ring clear of the shaft.

* * * * *